United States Patent [19]

Affa

[11] 4,061,366
[45] Dec. 6, 1977

[54] CONNECTOR

[76] Inventor: Stephen N. Affa, 23517 Ladeene, Torrance, Calif. 90505

[21] Appl. No.: 618,507

[22] Filed: Oct. 1, 1975

[51] Int. Cl.$^2$ ............................................. F16L 17/00
[52] U.S. Cl. ..................................... 285/37; 285/305; 285/403
[58] Field of Search ................. 285/37, 305, 356, 374, 285/403, 276, 277, 38, 347; 403/300, 306, 335, 343

[56] References Cited

U.S. PATENT DOCUMENTS

| 3,245,702 | 4/1966 | Smith | 285/305 |
| 3,273,919 | 9/1966 | Billeter et al. | 285/347 |
| 3,684,320 | 8/1972 | Platzer et al. | 285/403 X |
| 3,884,509 | 5/1975 | Marsh | 285/37 |

FOREIGN PATENT DOCUMENTS

| 1,104,248 | 6/1955 | France | 285/356 |

Primary Examiner—Wayne L. Shedd

[57] ABSTRACT

A tubular connector sleeve has a radially outwardly projecting inwardly open groove formed at one end which is defined by a radially outwardly projecting wall and a radially inwardly projecting flange at the end of the sleeve. A portion of the flange is cut away to provide access to the groove. A connector tube has a radially outwardly projecting flange at one end and the outside diameter of this flange is generally equal to the inside diameter of the connector sleeve so that the flange on the connector tube can extend inside the connector sleeve. A spiral lock ring is wound through the opening in the sleeve flange until the entire spiral lock ring is in the groove. The wall length of the spiral lock ring is greater than the depth of the groove so a portion of the ring wall extends radially inside the sleeve far enough beyond the internal surface of the sleeve so the radially outwardly projecting flange at the end of the connector tube abuts the portion of the spiral lock ring wall to prevent separation between the connector sleeve and the connector tube.

6 Claims, 9 Drawing Figures

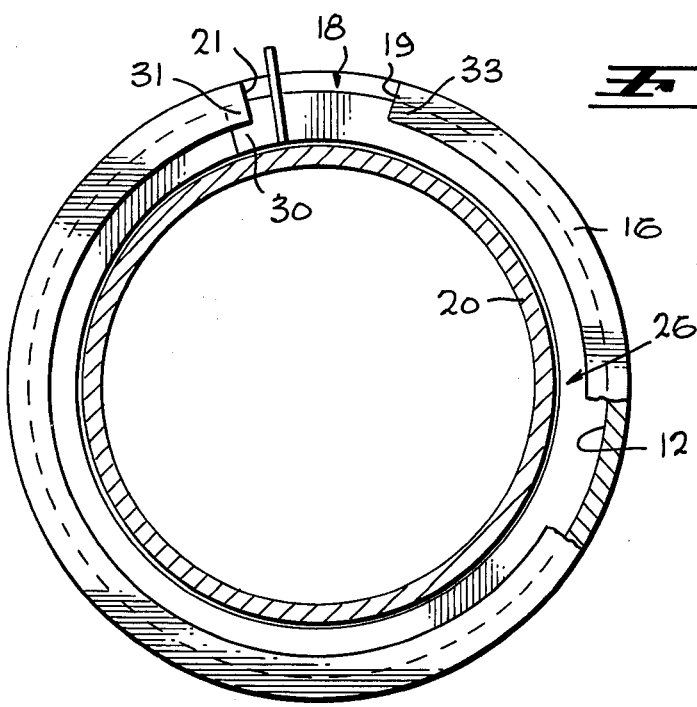
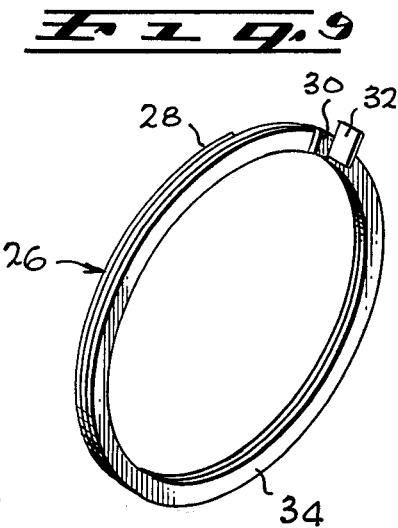
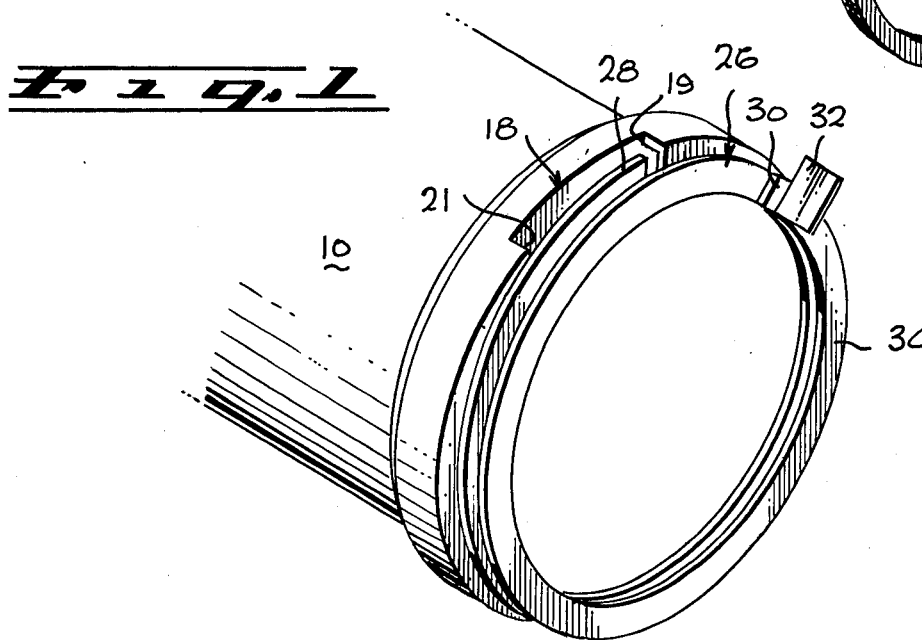

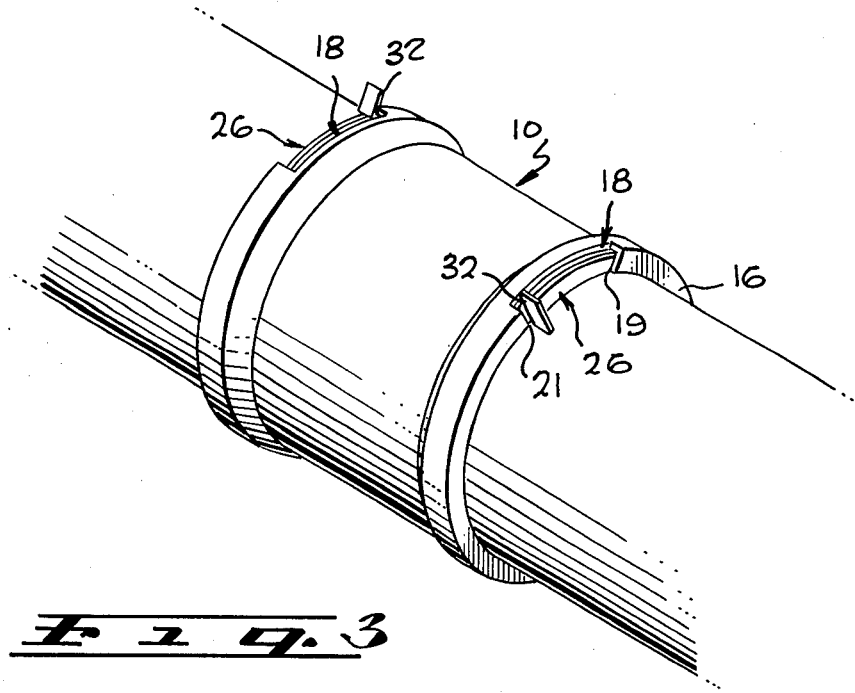
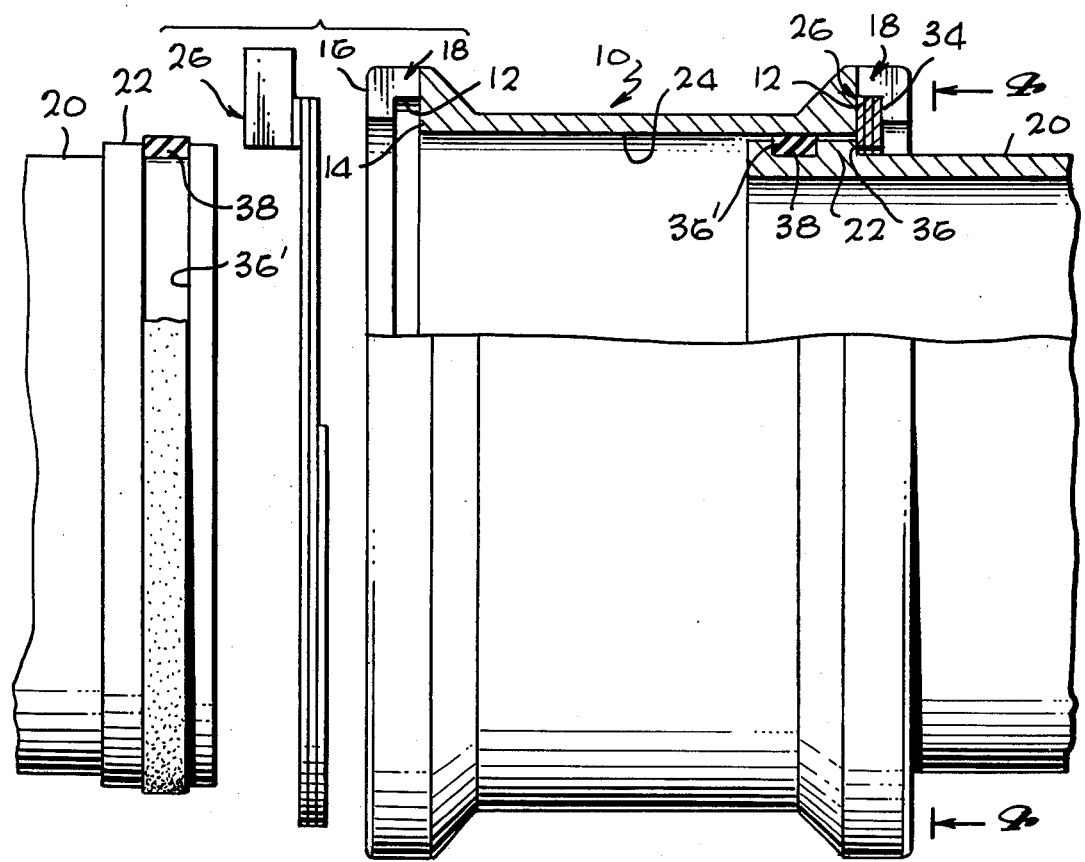

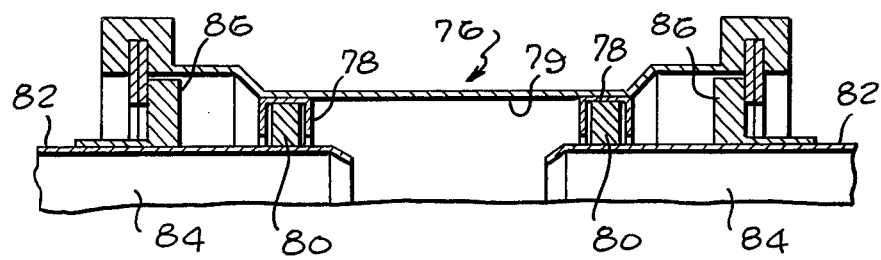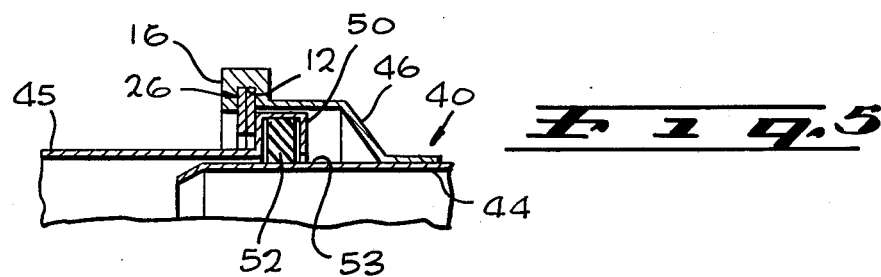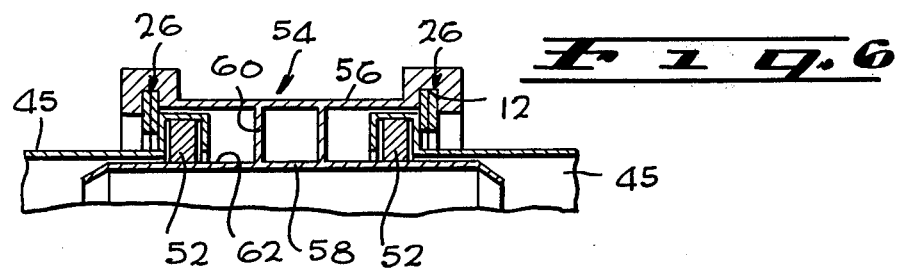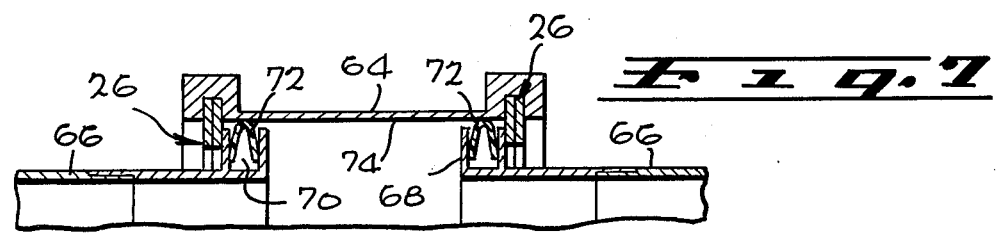

CONNECTOR

This invention relates to a connector and more particularly to a connector which can be assembled in a confined space without the use of tools.

BACKGROUND AND BRIEF SUMMARY

Tubes often have to be connected together or disassembled in confined, dark spaces, such as inside the wing of an aircraft. Heretofore, connectors which were available required the use of auxiliary tools and these tools were often difficult to operate in a confined space, particularly if the space was not illuminated. In addition, it was often necessary for the connectors to withstand substantial internal pressure and forces, and this required the connectors to be very strong which heretofore required strong forces to be exerted on the tool, and this further increased the difficulty of operating these auxillary tools.

What is needed, therefore, and comprises an important object of this invention, is to provide a connector which can be easily connected or disconnected in confined, dark spaces without the use of any tools.

A further object of this invention is to provide a connector which can withstand substantial internal pressures and forces and which can be easily connected or disconnected without the use of auxillary tools and under poor lighting conditions.

These and other objects of this invention will become more apparent when better understood in the light of the accompanying drawing and specification wherein:

FIG. 1 is a perspective view of the connector sleeve showing the spiral lock ring in the process of being inserted inside its groove.

FIG. 2 is a perspective view of the connector sleeve and the connector tubes locked together in assembled relation.

FIG. 3 is a side elevational view showing the connector sleeve with one of the connector tubes locked inside.

FIG. 4 is an elevational end view of the connector sleeve with the spiral lock ring locked in the groove and with a connector tube locked inside.

FIG. 5 is a first modification of the connector tube and sleeve in assembled relation.

FIG. 6 is a second modification of a connector tube and sleeve.

FIG. 7. is a third modification of a connector tube and sleeve.

FIG. 8 is a fourth modification of a connector tube and sleeve.

FIG. 9 is a perspective view of the spiral lock ring used in this invention.

Referring now to FIG. 3 of the drawing, a tubular connector sleeve indicated generally by the reference numeral 10 is provided with a radially outwardly projecting inwardly open groove 12 at each end. It is understood, however, that the principles of this invention could be practiced with a connector sleeve which is provided with an inwardly open groove at only one end. The grooves 12 are defined by a radially outwardly projecting wall 14 and a radially inwardly projecting flange 16 at the end of the sleeve. Flange 16 is generally circular, see FIG. 2, however, a portion of the periphery of flange 16 is removed to provide a groove access opening 18 for reasons to be described below. The opening 18 has an entrance 19 and a rear locking end 21.

A connector tube 20 having a radially outwardly projecting flange 22 at one end is designed to fit inside the sleeve 10. The outside diameter of the flange 22 is generally equal to the inside diameter of the sleeve 10, so flange 22 lies closely adjacent the protected inner sealing surface 24 of the sleeve 10 for reasons to become apparent below.

A spiral lock ring 26, see FIG. 9, preferably formed of flat spring steel, is provided. This lock ring has a front end 28 and rear end 30. A handle 32 is adjacent the rear end. The portion of the spiral lock ring to the rear of the handle forms a locking stub for reasons to be described below.

To lock the connector sleeve 10 and the connector tube 20 together, the connector tube 20 is first inserted inside the connector sleeve 10 until the flange 22 is beyond the axial location of the groove 12, as shown in FIG. 3. Then the entrance end 28 of the spiral lock ring 26 is inserted through the groove access opening 18 into the groove 12, see FIG. 1. Then by gripping handle 32 and rotating it around the axis of the connector tube 20, the entire spiral lock ring 26 is wound into the groove 12 until the coils of the spiral lock ring 20 are in abutting relationship as seen in FIG. 3.

The length of the walls 34 of the spiral lock ring is greater than the depths of the groove 12 and they project radially inwardly inside the connector sleeve 10 beyond the internal surface 24, see FIG. 3. With this arrangement, the connector sleeve 10 and the connector tube 20 are locked together because, if an attempt is made to separate them, then the wall 36 of the flange 22 would abut against the walls 34 of the spiral lock ring.

It is further clear that the strength of the connection between the connector sleeve 10 and the connector tube 20 depends on the number of abutting coils inside groove 12 and this in turn depends on the width of the groove. Accordingly, if greater strength is desired, as when the connector is to be used under conditions of high internal pressure, it is only necessary to increase the width of the groove and also increase the number of turns or coils in the spiral lock ring 26 until they fill the groove when they are in abutting relationship. The width of the groove 12 can be made variable by inserting in the groove circular shims (not shown) which could be peeled away from each other and removed to vary the width of the groove in accordance with the requirement of the job.

In this embodiment, the flange 22 of the connector tube 20 is provided with an "O" ring receiving groove 36 in which "O" ring 38 is mounted. The "O" ring is in sealing engagement with the sealing surface 24 which as seen in FIG. 1 is protected against injury because it is the inner surface of the sleeve 10. If additional sealing is required, the flange 22 can be elongated to provide additional "O" ring receiving grooves which contain additional "O" rings.

As shown in FIG. 4, once the connector sleeve 10 and the connector tube 20 and the spiral lock ring 26 are in position as shown in FIG. 2, then force is exerted on the handle 32 to pull the rear portion of the spiral lock ring in the opposite direction, from the position shown in FIG. 2 to the position shown in FIG. 4. In this position, the locking stub or rear end 30 of the spiral lock ring has entered into the rear or locking end 21 of opening 18, which is opposite the entrance 19 which receives the front end 28 of the spiral lock ring 26. This arrangement provides a positive lock for the spiral lock ring and prevents it from being accidently damaged or dislodged due to vibrations, as from aircraft operation.

It is noted that by simply inserting the entrance end 28 of the spiral lock ring 26 inside the groove 12 and then rotating the spiral lock ring around the axis of the sleeve 10, the spiral lock ring 26 can be easily wound into the groove 12 without substantial force or the use of any auxiliary tools. This is facilitated by the thinness and flexibility of the spiral turns. Furthermore, this can be done by feel in the absence of illumination which might occur if the connector was being used inside of an aircraft wing. To separate the connector sleeve 10 and the connector tube 20, the spiral lock ring is simply manually unwound out of the groove 12, and then the connector sleeve and the connector tube may be pulled apart.

The modification as shown in FIG. 5, and indicated generally by the reference numeral 40 is provided with a connector sleeve 42 which is formed in two parts. The inner part is a generally conventional tube 44. An outer connecting or skirt member 46 is welded to the outer sealing surface 53 of the tube 44 as shown in FIG. 5. This outer connecting member is provided with the radially inwardly open groove 12 and the flange 26 like that shown in FIG. 1. A connector tube 45 is provided with an outwardly projecting flange portion 50 which is inwardly open and which contains an "O" ring 52. The "O" ring 52 is in sealing engagement with the outer sealing surface 53 of the tube 44. In all other respects, the connection between the connector sleeve 40 and the connector tube 45 and the co-action with the spiral lock ring 26 is the same as that described in the embodiment shown in FIG. 1.

The modification shown in FIG. 6 is like that shown in FIG. 5 except the skirt 56 is modified somewhat to provide grooves 12 at opposed ends. It includes a connector sleeve indicated generally by the reference numeral 54 formed in two parts with the outer portion 56 secured to the inner cylindrical portion 58. These portions are connected together by connecting members 60 as shown. The grooves 12 at each end of skirt 56 contain spiral lock rings 26. The connector tube 45 is the same as that shown in modification shown in FIG. 5 and the "O" ring 52 engages the outer sealing surface 62 of the inner cylindrical portion 58. With this arrangement, the sealing surface 62 is protected against accidental injury which could effect its ability to make a good seal with the "O" rings.

The modification shown in FIG. 7 is provided with a connector sleeve 64 which is like the sleeve shown in FIG. 1. In this embodiment, however, the connector tubes 66 are formed with a radially outwardly projecting flange 68 which are cylindrical extensions of the connector tube. An outwardly open channel shaped seal ring receiving groove 70 is formed in flanges 68 and an air seal 72 is mounted in the groove or channel 70 as shown. This air seal bears against the protected inner sealing surface 74 of the connector sleeve 64 as described in connection with the embodiment shown in FIG. 1.

The modification shown in FIG. 8, the connector sleeve 76 is generally like the sleeve 10 shown in FIG. 1. In this embodiment, however, annular seal ring holders 78, channel shaped in cross-section, are secured as by welding to the inner surface 79 of the sleeve 76. The channels in the holders 78 are inwardly open and each retains an "O" ring 80. This "O" ring bears against the sealing surface 82 of the connector tubes 84. The connector tubes have cylindrical members secured thereto or its outer surface and terminating in a radially outwardly projecting flange member 86. The diameter of the flange member 86 is generally equal to the internal diameter of the connector sleeve 76. In assembled relation, the "O" rings 80 are in sealing engagement with surface 82 and the flange members 86 are positioned inside the connector sleeve 76 beyond the axial location of the grooves 12 whereby the connector tubes are releasably locked inside the connector sleeve. The flange members 86 co-act with the spiral ring 26 in the groove 12 in the connector sleeve 76 as described in connection with the embodiment shown in FIG. 1 and functions the same way.

Having described the invention, what I claim is new is:

1. A manually operable high pressure tubular gas connector for aircraft comprising a connector sleeve and a connector tube, said connector sleeve having opposed ends and wall formations shaped to form a radially extending inwardly open groove, said inwardly open groove having opposed radially projecting planar walls communicating with the inner surface of the connector sleeve, a planar radially inwardly projecting circular flange on at least one end of the connector sleeve forming a planar wall of said inwardly open groove, a part of said circular flange removed to provide an external spiral lock ring receiving opening to said groove, the arc length of said opening small in comparison to the circumference of said flange but sized to permit a spiral lock ring to be wound through said opening into said inwardly open groove, said connector tube having a flange thereon, said flange having at least one planar radially projecting wall facing said circular flange for engagement with a spiral lock ring, said connector tube mounted inside the connector sleeve with said flange of said connector tube positioned inside said connector sleeve beyond the axial location of said inwardly open groove, a spiral lock ring formed from flat spring material associated with said connector sleeve, the diameter of said spiral lock ring generally equal to the internal diameter of the depth of the groove, said spiral lock ring having planar walls and a thickness generally equal to the width of said groove whereby the planar walls of the groove engage and support the planar walls of the spiral lock ring to prevent vibration movement of the spiral lock ring in said groove, the walls of the spiral lock ring having a length generally larger than the depth of said groove, said spiral lock ring removably positioned in said groove through said opening so a portion of said planar walls of the spiral lock ring projects inwardly beyond the depth of said groove to close the opening in said flange and to provide a wall for continuous abutment with the planar wall of the flange on the connector tube to releasably hold the connector sleeve and connector tube together whereby the connector tube can be locked in the sleeve whenever the flange on the connector tube is located anywhere inside the connector sleeve beyond the inwardly open groove and the spiral lock ring is then wound into said groove so the connector sleeve and the connector tube can be connected together without precisely positioning the connector tube inside the connector sleeve, the walls of the spiral lock ring sufficiently flexible to permit the spiral lock ring to be manually wound through said opening in said flange into said groove against a resistance which is generally constant and independent of the number of turns of the spiral lock ring, the size of the connector sleeve, and the size of the connector tube, whereby the connector sleeve and the connector tube can be manually connected together in the dark without tools.

2. The tubular gas connector described in claim 1 wherein said spiral lock ring receiving opening has a front portion and a rear portion and said spiral lock ring has a front end and a rear end, a handle portion secured adjacent to the rear end of said spiral lock ring for manually winding said spiral lock ring into said groove, the portion of said spiral lock ring to the rear of said handle receiving portion forming a locking stub, said locking stub positioned in said groove through the rear portion of said spiral lock ring receiving opening to lock said spiral lock ring in said groove so that in assembled relation the connector sleeve and the connector tube are releasably held together against aircraft vibration.

3. The gas connector described in claim 1 wherein said connector sleeve has an inner sealing surface and said flange on said connector tube has an outwardly open radially outwardly projecting channel member formed thereon, a seal mounted in said channel member, said seal in spaced relation to said spiral lock ring and in engagement with the sealing surface of said connector sleeve whereby failure of said spiral lock ring cannot destroy the sealing integrity of the tubular gas connector.

4. The tubular connector described in claim 1 wherein said connector sleeve comprises a cylindrical tube having an outer sealing surface, a generally cylindrical skirt having an inner surface secured to said outer surface of said cylindrical tube, said radially extending inwardly open groove for receiving said spiral locking member formed on at least one end of said skirt, said tube flange on said connector tube comprising an inwardly open radially outwardly projecting channel member formed at one end for receiving a sealing member, the diameter of the base of said channel member generally equal to the diameter of the inner surface of said cylindrical skirt, said cylindrical tube positioned inside said skirt beyond the axial location of the inward open groove, and a sealing member in said channel member in sealing engagement with the outer sealing surface of said cylindrical tube and in spaced relationship to said spiral lock ring whereby failure of the spiral lock ring has no effect on the sealing engagement of the sealing member with the outer sealing surface of said cylindrical tube.

5. The tubular connector described in claim 3 wherein said flange portion comprises a cylindrical extension of a connector tube secured thereto.

6. The tubular connector described in claim 1 wherein said connector sleeve has radially inwardly open channel members secured to the inner surface of said connector sleeve for holding sealing members therein, said connector tube having a cylindrical member secured to its outer surface, said cylindrical member terminating in a radially outwardly projecting flange, the diameter of said flange generally equal to the internal diameter of said connector sleeve, sealing members in said channel members in sealing engagement with the outer surface of said connector tube and in spaced relationship to said spiral lock ring, whereby in assembly relation the connector tubes are inserted in each of said connector sleeve with said outwardly projecting flanges positioned inwardly beyond the axial location of said groove containing the spiral lock members whereby the connector tube and the connector sleeve are releasably locked together so that failure in said spiral lock ring has no effect on the sealing members.

* * * * *